(12) United States Patent
Yoshino et al.

(10) Patent No.: US 8,462,254 B2
(45) Date of Patent: Jun. 11, 2013

(54) IMAGE PICKUP APPARATUS CAPABLE OF SETTING A PHOTOGRAPHIC CONDITION AND CONTROL METHOD THEREFOR

(75) Inventors: Eiji Yoshino, Kawasaki (JP); Chiyumi Niwa, Kawasaki (JP); Daisuke Hirohashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 494 days.

(21) Appl. No.: 12/185,743

(22) Filed: Aug. 4, 2008

(65) Prior Publication Data

US 2009/0040332 A1    Feb. 12, 2009

(30) Foreign Application Priority Data

Aug. 7, 2007   (JP) .................................. 2007-205407

(51) Int. Cl.
*H04N 5/222*    (2006.01)
(52) U.S. Cl.
USPC ....................................... 348/333.04; 348/371
(58) Field of Classification Search
USPC .......................... 348/211.3, 371; 396/163, 282
See application file for complete search history.

(56) References Cited

U.S. PATENT DOCUMENTS

| | | | |
|---|---|---|---|
| 6,510,283 B1 * | 1/2003 | Yamagishi | ...................... 396/55 |
| 6,650,834 B2 | 11/2003 | Ume | |
| 6,975,415 B2 * | 12/2005 | Yamade | ........................ 358/1.13 |
| 2004/0150724 A1 * | 8/2004 | Nozaki et al. | .............. 348/211.4 |

FOREIGN PATENT DOCUMENTS

| | | |
|---|---|---|
| JP | 2001-054006 A | 2/2001 |
| JP | 2003-043559 A | 2/2003 |

* cited by examiner

*Primary Examiner* — Albert Cutler
(74) *Attorney, Agent, or Firm* — Canon USA Inc IP Division

(57) ABSTRACT

An image pickup apparatus includes a display unit configured to display a setting item screen for displaying setting items regarding a photographic condition, and a setting value screen configured to display setting values regarding the setting item selected on the setting item screen; an operation unit configured to select one of the setting items on the setting item screen and to select one of the setting values on the setting value screen; and a control unit configured to set a setting item regarding the photographic condition according to the setting value selected on the setting value screen, wherein if a state of the image pickup apparatus is changed from a state in which the selected setting item is active to non-active, the display unit continuously displays information indicating that the selected setting item is currently selected even when the selected setting item is non-active.

13 Claims, 9 Drawing Sheets

IMAGE PICKUP APPARATUS CAPABLE OF SETTING A PHOTOGRAPHIC CONDITION AND CONTROL METHOD THEREFOR

BACKGROUND OF THE INVENTION

1. Field of the Invention

The present invention relates to an image pickup apparatus including a display unit, such as a digital camera. More specifically, the present invention relates to the display of setting items on the display unit during photographing.

2. Description of the Related Art

Photographing under various conditions has been performed using digital cameras or film cameras, such as photographing with natural light in daytime, photographing with flash light in which a flash of light is emitted to illuminate an object in the dark, and daylight synchronization in which photographing with both natural light and flash light is performed.

Besides normal photographing with appropriate exposure (hereinafter referred to as "correct exposure") under the above-described conditions, for example, a photographer may expose an object for a time shorter than the correct exposure time, i.e., underexposure, in order to achieve high-quality photographic effects. Inversely, a photographer may expose an object for a time longer than the correct exposure time, i.e., overexposure. In view of such various photographic situations, image pickup apparatuses and external flash devices capable of performing exposure control according to photographers' intentions have been proposed and are now widely used.

Japanese Patent Laid-Open No. 2003-043559 discloses an image pickup apparatus including an operation member capable of appropriately setting an amount of correction for a fixed amount of light emission or calculated light-control value of an external flash device (hereinafter referred to as light-control correction value). According to a technique employed in the image pickup apparatus, even if the external flash device does not have a function of setting the fixed amount of light emission, the fixed amount of light emission can be appropriately set by operating the image pickup apparatus.

It is assumed that an external flash device is connected to a camera to set a light-control correction value of the external flash device using the camera. If the external flash device has been powered on, the camera is operated to display, on a display unit of the camera, a menu for setting the light-control correction value of the external flash device to change a set value.

FIG. 8 shows an example of a display screen of a display unit disposed on a rear surface of a camera for displaying a window for setting a light-control correction value of an external flash device. A specific button of the camera is operated to display a list of icons indicating frequently used functions on the display unit disposed on the rear surface of the camera where an image of an object is displayed. Examples of the frequently used functions include a white balance setting, a photometric setting, and a light-control correction setting. In FIG. 8, the icons are vertically arranged side-by-side along the left edge of the screen of the display unit. The icon corresponding to the light-control correction setting is placed in the fourth row from the top. When an indicator moving over the icons is moved and the icon corresponding to the light-control correction setting is selected, specific setting values are displayed on a lower portion of the screen of the display unit so that a user can select a desired value.

Some cameras are capable of switching the operating state of an external flash device attached to the cameras between a power-on state and a power-off state to determine whether to emit light from the external flash device during photographing.

Similarly to FIG. 8, FIG. 9A shows a screen of a display unit for allowing a user to set, using a camera, a light-control correction value of an external flash device attached to the camera after the user powers on the external flash device. If the external flash device is powered off in this state, the setting of the light-control correction value using the camera is disabled.

Japanese Patent Laid-Open No. 2001-054006 discloses a technique in which, as shown in FIG. 9B, the display of an icon corresponding to a function that is not available for selection is changed from highlighted to grayed out to change the state of the icon to a non-active state so that a user can easily recognize an item that is not available for selection. In accordance with the change of the display, the indicator located on the icon indicating the light-control correction setting in the manner shown in FIG. 9A is moved to the below icon indicating another function (in this example, the photometric setting) in the manner shown in FIG. 9B.

In the technique disclosed in Japanese Patent Laid-Open No. 2001-054006, even if the external flash device is powered on again to perform flash light photographing, the indicator is still located on the icon indicating the photometric setting, which is displayed below the icon indicating the light-control correction setting. That is, in order to set a light-control correction value, it is necessary to power on the external flash device and to move the indicator located on the icon indicating the photometric setting to the icon indicating the light-control correction setting.

Accordingly, due to the bothersome procedure of selecting a menu for setting a light-control correction value, it is difficult to smoothly perform photographing under varying photographic conditions using the determination of whether to emit light from an external flash device and using light-control correction during flash light photographing.

Further, regardless of whether an external flash device is used, if an indicator is moved from a selected setting item due to a change of the photographic conditions, a time-consuming operation of moving the indicator to the selected setting item again is required.

SUMMARY OF THE INVENTION

An aspect of the present invention provides an image pickup apparatus including a display unit configured to display a setting item screen for displaying setting items regarding a photographic condition, and a setting value screen configured to display setting values regarding the setting item selected on the setting item screen, and to display information indicating which of the setting item selected on the setting item screen is currently selected; an operation unit configured to select one of the setting items on the setting item screen and to select one of the setting values on the setting value screen; and a control unit configured to set a setting item regarding the photographic condition according to the setting value selected on the setting value screen, wherein if a state of the image pickup apparatus is changed from a state in which the selected setting item is active to a state in which the selected setting item is non-active, the display unit continuously displays information indicating that the selected setting item is currently selected even when the selected setting item is non-active, and the control unit prohibits the changing of the setting value regarding the selected setting item.

Other aspects and features of the present invention will become apparent from the following description and the attached drawings.

DESCRIPTION OF THE EMBODIMENTS

Embodiments of the present invention will now be described.

First Embodiment

Figure 1:
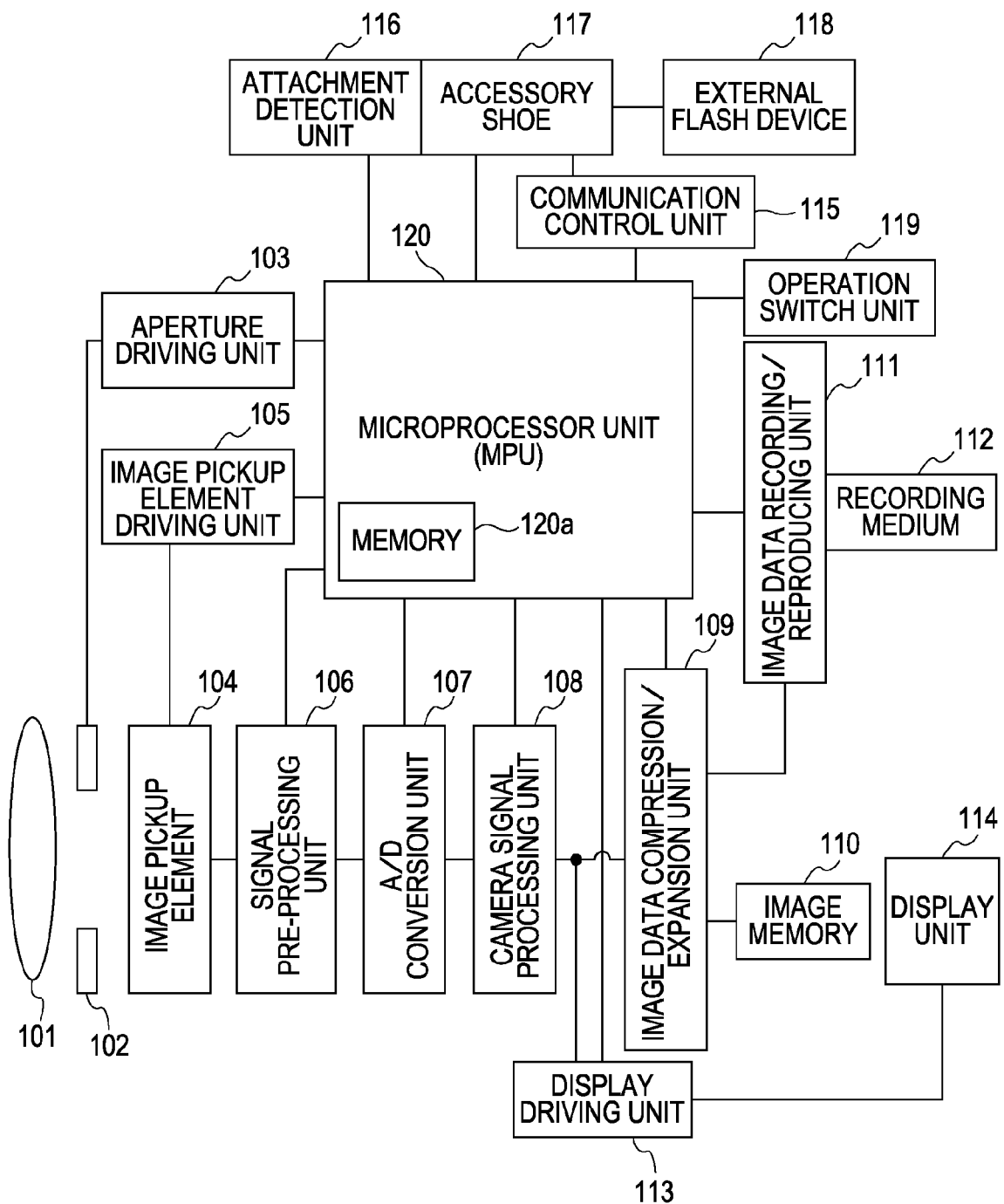
FIG. 1 is a diagram showing a circuit structure of an image pickup apparatus according to an embodiment of the present invention.

FIG. 1 is a diagram showing an exemplary circuit structure of an image pickup apparatus according to an embodiment of the present invention. In FIG. 1, the image pickup apparatus includes an image pickup lens 101, an aperture mechanism 102, an aperture driving unit 103, a two-dimensional image pickup element 104 such as a charged coupled device (CCD) sensor or a complementary metal-oxide semiconductor CMOS sensor, an image pickup element driving unit 105, a signal pre-processing unit 106, an analog-to-digital (A/D) conversion unit 107, a camera signal processing unit 108, an image data compression/expansion unit 109, an image memory 110, an image data recording/reproducing unit 111, a display driving unit 113, a display unit 114 such as a liquid crystal display or a cathode-ray tube (CRT) display, a communication control unit 115, an attachment detecting unit 116, an accessory shoe 117, an operation switch unit 119, and a microprocessor unit (MPU) 120 having an internal memory 120a. The aperture mechanism 102 is configured to control the amount of incident light, and also operates as a shutter. The aperture driving unit 103 is configured to drive the aperture mechanism 102. The image pickup element driving unit 105 is configured to drive the image pickup element 104. The signal pre-processing unit 106 is configured to perform correlated double sampling or automatic gain control (AGC). The A/D conversion unit 107 is configured to convert an analog signal into a digital signal. The camera signal processing unit 108 is configured to process the converted digital signal.

The image data compression/expansion unit 109 is configured to compress and expand image data. The image data recording/reproducing unit 111 is configured to record and reproduce the compressed image data. The display driving unit 113 is configured to drive the display unit 114. The communication control unit 115 is configured to control communication with an external flash device 118 attached to the image pickup apparatus through the accessory shoe 117. The attachment detecting unit 116 is configured to detect the attachment of the external flash device 118 which is placed in the accessory shoe 117. The operation switch unit 119 includes a shutter button that provides a trigger for starting a recording operation, and other suitable buttons. The MPU 120 operates as a control unit configured to control a series of operations of the image pickup apparatus, and the memory 120a is configured to store a light-control setting value and any other suitable value.

Next, the operation of the image pickup apparatus having the structure described above will be described.

In an environment with sufficient illuminance to photograph an object, a light flux passing through the image pickup lens 101 is directed to the aperture mechanism 102 to appropriately control the exposure, and is photoelectrically converted by the image pickup element 104. The image pickup element 104 is controlled by the image pickup element driving unit 105 to accumulate electric charge for a certain period of time. The signal pre-processing unit 106 performs correlated double sampling and gain control, and the A/D conversion unit 107 converts an analog single into a digital signal. The converted digital signal is supplied to the camera signal processing unit 108 to perform processing such as auto white balance and unsharp masking for edge enhancement. The signal processed by the camera signal processing unit 108 is transmitted to the MPU 120, and feedback control is performed based on this signal. In a case where the external flash device 118 is used, the communication control unit 115 establishes communication with the external flash device 118 to obtain a setting value set in the external flash device 118 or to perform the setting of the external flash device 118 using the image pickup apparatus. The determination of whether to perform communication is performed based on a result detected by the attachment detecting unit 116, which will be described below.

The MPU 120 controls the aperture driving unit 103, the image pickup element driving unit 105, and the signal pre-processing unit 106 so that signals for aperture control, control of the electric charge accumulation time, and gain control described above, which are input to the MPU 120, are adjusted to appropriate values.

The signal processed by the camera signal processing unit 108 is supplied to the display driving unit 113 during recording, and a photographed image is displayed in real time (live-view image) on the display unit 114. At the same time, a trigger for starting a recording operation is input from the operation switch unit 119. Then, the MPU 120 controls the aperture mechanism 102 using the aperture driving unit 103 to set an aperture value for photographing, and controls the signal pre-processing unit 106 to set sensitivity for photographing.

The MPU 120 also controls the aperture mechanism 102 using the aperture driving unit 103 to close the aperture for an accumulation time for photographing and to perform a shutter operation. Thereafter, the image pickup element 104 exposes the object for the specified accumulation time. An instruction signal is supplied to the external flash device 118 through the accessory shoe 117 in synchronization with the start or end of the exposure time, and a light-emission unit of the external flash device 118 emits light.

At the end of the accumulation time, the aperture mechanism 102 is controlled to close the aperture to block light. An image signal read during the blocking of light is converted by the A/D conversion unit 107 from an analog signal to a digital signal, and is then supplied to the image data compression/expansion unit 109 through the camera signal processing unit 108. The image data compression/expansion unit 109 temporarily stores image data in the image memory 110, and sequentially compresses the image data using a compression format such as a JPEG (Joint Photographic Experts Group) format. The compressed image data is output to the image data recording/reproducing unit 111, and is recorded onto a recording medium 112 such as a semiconductor memory.

During reproduction, the image data recording/reproducing unit 111 reads image data from the recording medium 112, and supplies the read image data to the image data compression/expansion unit 109. The image data is expanded by the image data compression/expansion unit 109. The expanded image data is temporarily stored in the image memory 110, and is then supplied to the display driving unit 113 to reproduces the image data as an image on the display unit 114.

The relationship between the external flash device 118 and the image pickup apparatus will now be described in detail.

Figure 2:
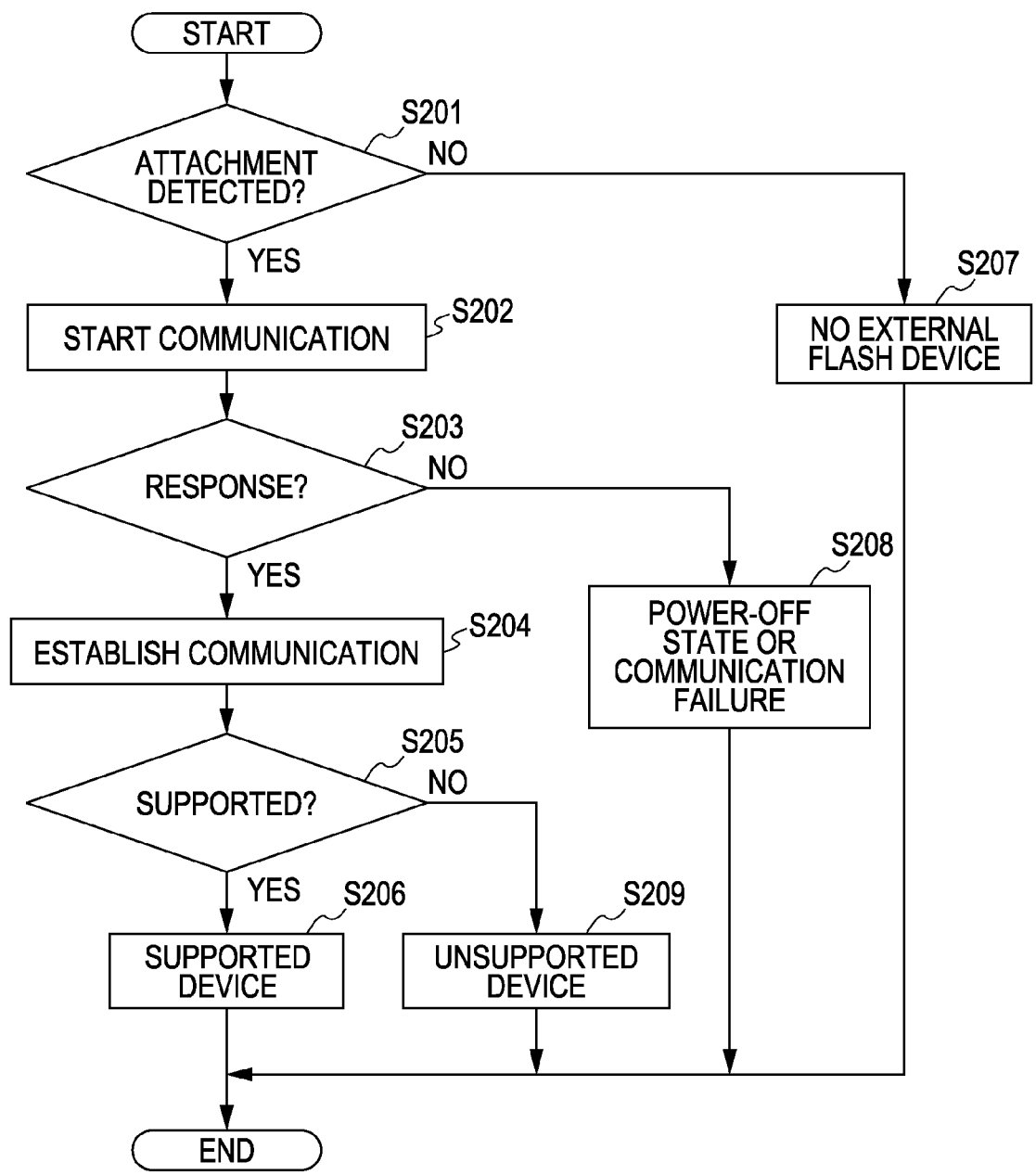
FIG. 2 is a flowchart showing a sequence for detecting the attachment of an external flash device.

FIG. 2 is a flowchart showing a sequence for detecting the attachment of the external flash device 118, which is performed by the MPU 120. In step S201, it is determined whether the attachment detecting unit 116, which may be formed of a mechanical switch, has detected the attachment (connection) of the external flash device 118. If the attachment of the external flash device 118 has not been detected (NO in step S201), the sequence proceeds to step S207, in which it is determined that there is no external flash device attached to the image pickup apparatus.

If the attachment of the external flash device 118 has been detected (YES in step S201), the sequence proceeds to step S202, in which the communication control unit 115 starts communication with the external flash device 118 through the accessory shoe 117. Then in step S203, it is determined whether a desired response has been received from the external flash device 118. If the response has not been received (NO in step S203), the sequence proceeds to step S208, in which it is determined that the external flash device 118 has not been powered on or that communication with the external flash device 118 has failed or the connection with the external flash device 118 has not been successfully established.

If the desired response has been received from the external flash device 118 (YES in step S203), the sequence proceeds to step S204, in which it is determined that communication has been successfully established. Then in step S205, various types of communication are performed to obtain information such as what function the attached external flash device 118 has. If it is found that the image pickup apparatus does not support the change of the setting of the external flash device 118 (NO in step S205), the sequence proceeds to step S209, in which a flag indicating an unsupported flash device is set. If it is found that the image pickup apparatus supports the change of the setting of the external flash device 118 (YES in step S205), the sequence proceeds to step S206, in which a flag indicating that the external flash device 118 is a supported flash device is set. At this time, an indication that light can be emitted from the external flash device 118 may be displayed on the display unit 114.

According to the sequence shown in FIG. 2, in a case where the external flash device 118 that can emit light according to an instruction from the image pickup apparatus has been attached, flash light photographing can be performed using the external flash device 118.

The image pickup apparatus mainly has two flash light control modes as light emission control modes in the photographing operation.

A first flash light control mode is an automatic light control mode. In the automatic light control mode, first, the MPU 120 calculates the amount of light emission required for photographing (main-flash time) from the amount of increased light of an image signal obtained by a pre-flash of the external flash device 118 with respect to an image signal obtained under external light. The calculation result, as well as a predetermined command signal, is transmitted via serial communication through the accessory shoe 117 from the communication control unit 115, and the calculated amount of light is emitted during photographing. In various modes of the image pickup apparatus, such as a program mode, an automatic mode, or a scene mode in which the image pickup apparatus automatically performs appropriate exposure or white balance control in various scenes, light is generally emitted in the automatic light control mode.

A second flash light control mode is a manual lighting mode in which light is emitted according to a fixed amount of light, which is represented by a guide number measuring the amount of light emission produced. The manual lighting mode is expected to be used, in manual mode or aperture-priority mode of the image pickup apparatus, in a scene with a flash of light produced from a flash device according to a guide number desired by a user. The automatic light control mode or the manual lighting mode can be set through a user interface of the image pickup apparatus (hereinafter referred to as a camera UI), which may include the operation switch unit 119 and the display unit 114, or can be set using a switching member, which may be provided on the external flash device 118.

A flash light control item for setting a flash light control mode can be selected from a menu displayed on the camera UI. When a MENU button of the operation switch unit 119 of the camera UI is pressed, a menu screen is displayed on the display unit 114.

On the menu screen, one or more selectable items are listed. Examples of the items to be selectable include a flash light control item for setting a flash light control mode, a camera-shake correction item for performing camera-shake correction, and a self-timer setting item for performing self-timer photographing. An indicator is moved using an up-down button of a cross keypad included in the operation switch unit 119 to select an item for which the setting is to be performed, and a SET button included in the operation switch unit 119 is pressed to allow the user to move to a setting screen for the currently selected item. Any other menu arrangement may be used. For example, a setting value or setting state that is currently set for a given selectable item may appear alongside the given selectable item on the menu screen, and the indicator may be moved using a right-left button of the cross keypad included the operation switch unit 119 to change the setting. Alternatively, the selectable items may include an item that, when selected, allows the user to move to a next setting screen, and an item for which the setting can be changed using the right-left button of the cross keypad.

When the flash light control item is selected and it is determined in step S207 shown in FIG. 2 that there is no external flash device attached to the image pickup apparatus, a menu for performing flash light control of an internal flash device (not shown) is displayed. Examples of items that can be set in this case include an item for setting the automatic light control mode or the manual lighting mode, an item for setting a light-control correction value or a fixed amount of light emission, and an item for setting first curtain synchronization or second curtain synchronization. In the first curtain synchronization, light is emitted at the time of the start of exposure. In the second curtain synchronization, light is emitted immediately before the end of exposure. The examples of the items further include an item for setting whether flash light photographing using the internal flash device is allowed during photographing with an exposure time longer than a predetermined exposure time.

When the flash light control item is selected and it is determined in step S206 shown in FIG. 2 that the image pickup apparatus supports the change of the setting of the external flash device 118, a lighting setting menu for an external flash device is displayed. Examples of items that can be set in this case include, in addition to items on the menu for performing flash light control of the internal flash device, an item for setting wireless lighting, which is a function allowed only for an external flash device.

When the flash light control item is selected on the camera UI and it is determined in step S208 or S209 shown in FIG. 2 that the external flash device 118 is in a power-off state or the image pickup apparatus does not support the change of the setting of the external flash device 118, the desired setting of the external flash device 118 may not possibly be performed using the image pickup apparatus. Thus, the flash light control item is not displayed. In this case, however, there is a possibility that an external flash device capable of emitting light when the shutter button for triggering a recording operation, which is included in the operation switch unit 119, is pressed. Thus, light is not emitted from the internal flash device, and a lighting instruction signal is supplied to the external flash device 118 through the accessory shoe 117 in synchronization with the time of exposure. The menu screen including the flash light control item is configured to display a live-view image instead of displaying a menu when the shutter button is pressed with the menu screen displayed.

The operation switch unit 119 further includes a FUNC button in addition to the MENU button. When the FUNC button is pressed, a FUNC menu is displayed on the display unit 114. The FUNC menu includes, for example, a list of items for setting frequently used functions such as white balance, light-control correction, the fixed amount of light emission, noise reduction, the compression ratio of image data, and the number of pixels of image data. In the menu displayed by operating the FUNC button, items regarding flash light control include the item of the light-control correction setting in the automatic light control mode, and the item for the setting of the fixed amount of light emission in the manual lighting mode.

Figure 3A:
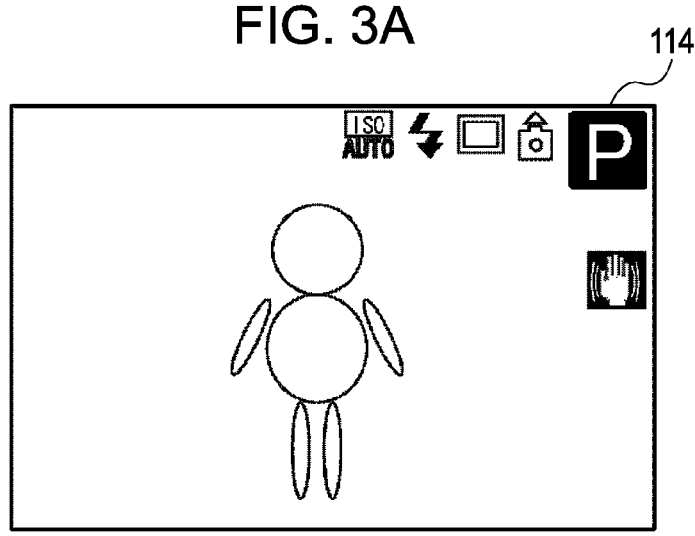
FIGS. 3A and 3B are diagrams showing an example of a display screen of a display unit on which a photographed image is displayed in real time.
Figure 3B:
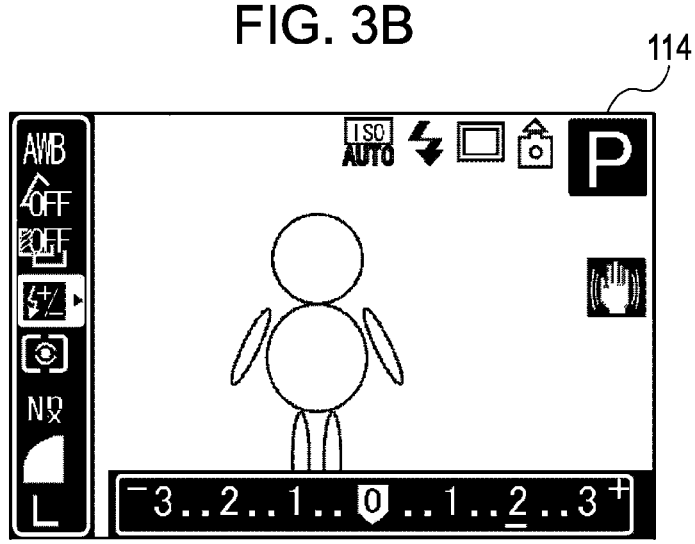

FIG. 3A shows a live-view image displayed on the display unit 114 before the FUNC button is pressed, and FIG. 3B shows an example of the FUNC menu displayed by pressing the FUNC button. In FIG. 3B, a plurality of items are vertically arranged side-by-side along the left edge of the display unit 114, and are displayed as FUNC menu items in the form of icons. As information indicating which icon among the displayed icons is currently selected, the currently selected icon is reversed and an indicator is displayed alongside the selected icon. Any other information that allows a user to recognize that one of the icons is currently selected may be displayed with respect to the selected icon. The indicator can be moved by operating the up-down button of the cross keypad included in the operation switch unit 119 to change a selection item.

In FIG. 3B, a window indicating a list of setting values using a value scale is displayed at a lower corner of the display unit 114. This is a window for performing the light-control correction setting, which is currently selected, and indicates that the setting of increasing the amount of light emission by two levels with respect to an appropriate value is currently selected. The window for selecting a setting value is different depending on each FUNC menu item displayed along the left edge, and may be displayed in a form suitable for selection of a setting value regarding the corresponding item. In FIG. 3B, as information regarding which setting value is currently selected, an indicator is displayed beneath the currently selected setting value. The indicator may be moved by operating the right-left button of the cross keypad included in the operation switch unit 119 to select a setting value. As can be seen from FIG. 3B, the FUNC menu is displayed so as to be superimposed on the live-view image. It is easy to perform photographing with the FUNC menu displayed, and, unlike a menu screen, the display of the FUNC menu remains even during a photographing operation.

In order to perform photographing without emitting a flash of light from the external flash device 118, the photographing operation can be performed with the external flash device 118 powered off.

Figure 4:
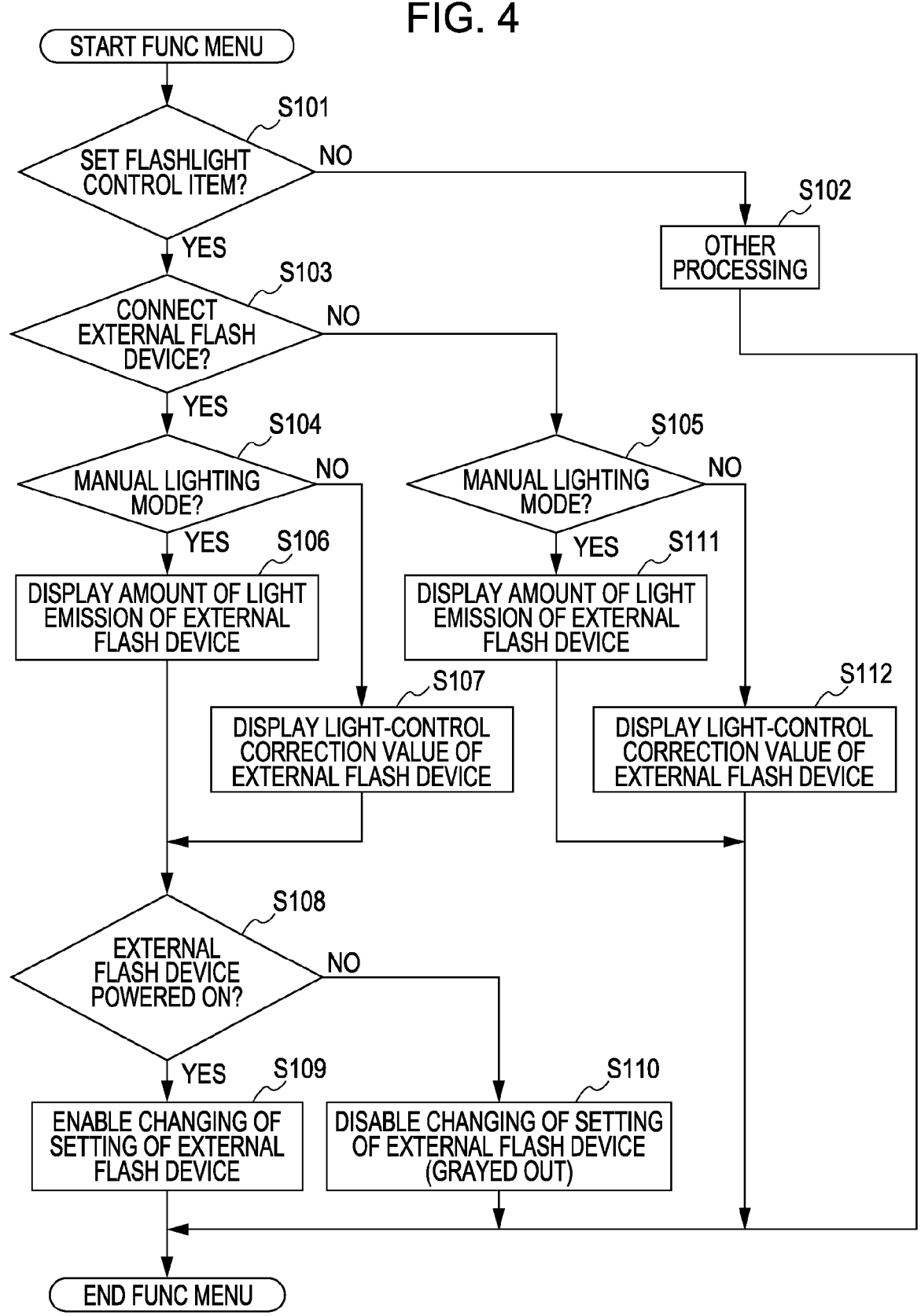
FIG. 4 is a flowchart showing a process for displaying a window for setting a light-control correction value or a fixed amount of light emission, which is performed by the image pickup apparatus in the present embodiment.

FIG. 4 is a flowchart showing a process for displaying a window for setting a light-control correction value or a fixed amount of light emission, which is performed by the image pickup apparatus in the present embodiment.

When a shooting mode is set and the FUNC button included in the operation switch unit 119 is pressed to display a FUNC menu on the display unit 114, the flow shown in FIG. 4 starts.

In step S101, it is determined whether an icon corresponding to an item regarding flash light control is currently selected in the FUNC menu. The item regarding flash light control refers to an item for setting a light-control correction value when the image pickup apparatus is operating in the automatic light control mode, or an item for setting a fixed amount of light emission when the image pickup apparatus is operating in the manual lighting mode. If the icon corresponding to the item regarding flash light control is not currently selected (NO in step S101), the flow proceeds to step S102, in which processing corresponding to the item corresponding to a currently selected icon is performed. Then, the flow ends. If the icon corresponding to the item regarding flash light control is currently selected (YES in step S101), the flow proceeds to step S103.

In step S103, it is determined whether the external flash device 118 has been connected to the image pickup apparatus. If the external flash device 118 has been connected (YES in step S103), the flow proceeds to step S104.

In step S104, it is determined whether the current lighting mode of the external flash device 118 is the manual lighting mode. If the current lighting mode is the manual lighting mode (YES in step S104), the flow proceeds to step S106. If the current lighting mode is the automatic light control mode (NO in step S104), the flow proceeds to step S107.

In step S106, the display unit 114 displays a window indicating setting values of the fixed amount of light emission of the external flash device 118 along the lower edge of the screen. Then, the flow proceeds to step S108.

In step S107, as shown in FIG. 3B, the display unit 114 displays a window indicating setting values of light-control correction of the external flash device 118 along the lower edge of the screen. Then, the flow proceeds to step S108.

In step S108, it is determined whether the external flash device 118 has been powered on. If the external flash device 118 has been powered on (YES in step S108), the flow proceeds to step S109. If the external flash device 118 has not been powered on (NO in step S108), the flow proceeds to step S110. If the external flash device 118 has been powered on, the setting of automatic light control mode or manual lighting mode is set active. If the external flash device 118 has been powered off, the setting of automatic light control mode or manual lighting mode is set non-active.

Figure 5A:
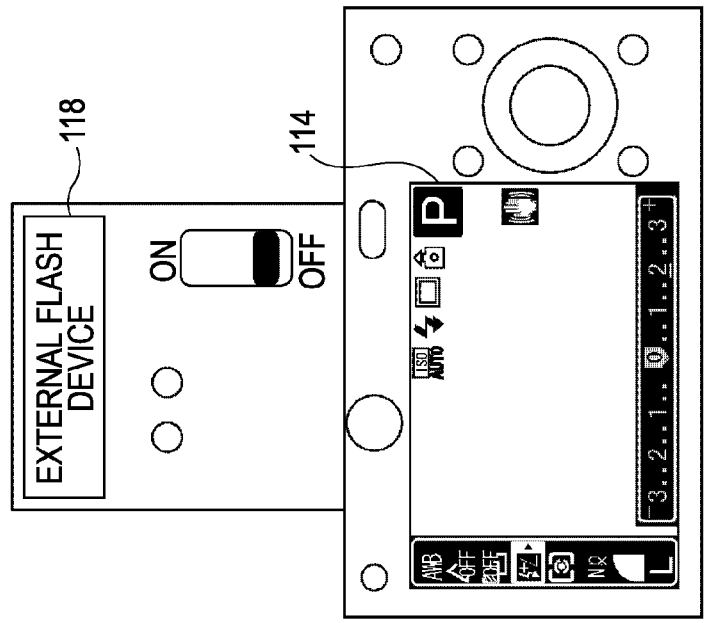
FIGS. 5A and 5B are diagrams showing a change in the display style in which a list of correction values for light-control correction according to the present embodiment is displayed.

In step S109, since the image pickup apparatus is enabled to change the setting of the external flash device 118, as shown in FIG. 5A, the display unit 114 highlights the window indicating the setting values, which is displayed along the lower edge of the screen. Then, one of the setting values is set in a selectable state according to the operation of the operation switch unit 119. When the user selects one of the setting values and then operates the SET button of the operation switch unit 119, the selected setting value is stored in the memory 120a. The MPU 120 instructs the external flash device 118 to perform flash light control with the stored setting value. Then, the flow ends.

Figure 5B:
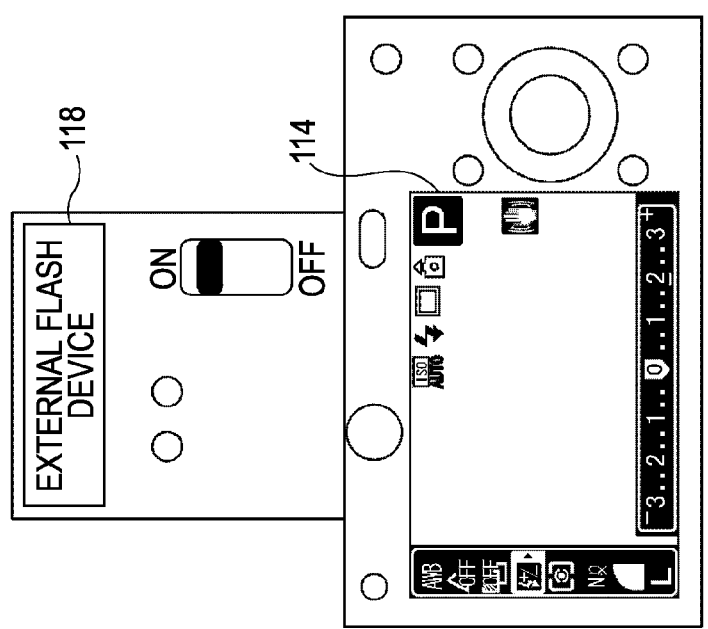

In step S110, since the setting of automatic light control mode or manual lighting mode is non-active, the MPU 120 prohibits the changing of a setting value displayed in the window along the lower edge of the screen. As shown in FIG. 5B, the display unit 114 displays the window indicating the list of setting values in a grayed out manner to indicate that the image pickup apparatus is disabled to change the setting of the external flash device 118.

However, unlike an existing screen, although the window indicating the list of setting values displayed along the lower edge of the screen is displayed grayed out to prohibit the user from selecting a setting value, the icon indicating the light-control correction item is displayed in an active state on the FUNC menu displayed along the left edge of the screen, and the light-control correction item is still selected. When an icon corresponding to a different item on the FUNC menu is selected, when the FUNC menu is terminated, or when the external flash device 118 is powered off, the flow ends. While the processing of steps S109 and S110 has been described in the context of a setting value of light-control correction in the automatic light control mode, display processing similar to that described above is performed for the fixed amount of light emission in the manual lighting mode.

Accordingly, in a case where the light-control correction item has been selected in an image pickup apparatus, even if an external flash device is powered off to disable the setting of light-control correction, an icon indicating the light-control correction item is displayed in an active state on the image pickup apparatus, and the light-control correction item is still selected.

With this configuration, when the external flash device is powered on again to enable photographing with a flash of light emitted from the external flash device, the setting of light-control correction can immediately be performed. Furthermore, the changing of a specific setting value of light-control correction is prohibited for a period of time during which the external flash device is powered off. This prevents a user from unintentionally changing a setting value due to an erroneous operation.

If it is determined in step S103 that the external flash device 118 has not been connected (NO in step S103), the flow proceeds to step S105.

In step S105, it is determined whether the current lighting mode of the internal flash device (not shown) of the image pickup apparatus is the manual lighting mode. If the current lighting mode is the manual lighting mode (YES in step S105), the flow proceeds to step S111. If the current lighting mode is the automatic light control mode (NO in step S105), the flow proceeds to step S112.

In step S111, the display unit 114 displays a window indicating a list of setting values of the fixed amount of light emission of the internal flash device along the lower edge of the screen. A fixed amount of light emission selected by the user is stored, and the flow ends.

In step S112, as shown in FIG. 3B, the display unit 114 displays a window indicating a list of setting values of light-control correction of the internal flash device along the lower edge of the screen. A setting value selected by the user is stored, and the flow ends.

According the present embodiment, therefore, the display style in which a window indicating a list of setting values for setting a light-control correction value of an external flash device is displayed is changed depending on the power-on or power-off state of an external flash device. This allows a user to visually recognize whether an item for setting a light-control correction value of the external flash device is active or non-active. Furthermore, if an icon indicating an item regarding light-control correction of the external flash device has been selected as the previously selected icon in the FUNC menu, this icon is displayed in an active state and the corresponding item is still selected even if the external flash device is powered off. Thus, when the external flash device is powered on again, the setting of light-control correction of the external flash device can be immediately performed.

Therefore, an image pickup apparatus capable of performing photographing, while frequently switching settings regarding light-control correction and regarding the emission of a flash of light from a flash device, without causing a user to perform any additional operation is achieved.

Second Embodiment

In the first embodiment, an external flash device is powered off in a state where an item for setting a light-control correction value of the external flash device is currently selected, by way of example. In a second embodiment of the present invention, another example in which, regardless of whether an external flash device is used, in a case where an icon currently selected on the FUNC menu is set non-active in accordance with a change of the photographic conditions during the display of the FUNC menu, the currently selected icon is displayed in an active state and the currently selected setting item is still selected while a window indicating a list of setting values of the selected icon is displayed grayed out will be described.

FIGS. 6A to 7B show an example of the display of items on the FUNC menu according to the present embodiment. The items on the FUNC menu according to the present embodiment include an item for a white balance setting, an item for a "My Color" setting for appropriately changing the contrast or color density to perform photographing, an item for a bracket shooting setting, and an item for a light-control correction setting. The items further include an item for a photometric setting, an item for setting whether to turn on or turn off a neutral density (ND) filter, an item for a compression ratio setting, and an item for an image size setting. When the FUNC button is pressed, a list of icons corresponding to the above-listed items is displayed on the display unit 114. The image pickup apparatus of this embodiment has a program mode and an auto mode. In the program mode, a user is allowed to appropriately set specific setting values of those items. In the auto mode, the image pickup apparatus automatically controls the setting of setting values of those items without allowing a user to perform the setting.

Figure 6A:
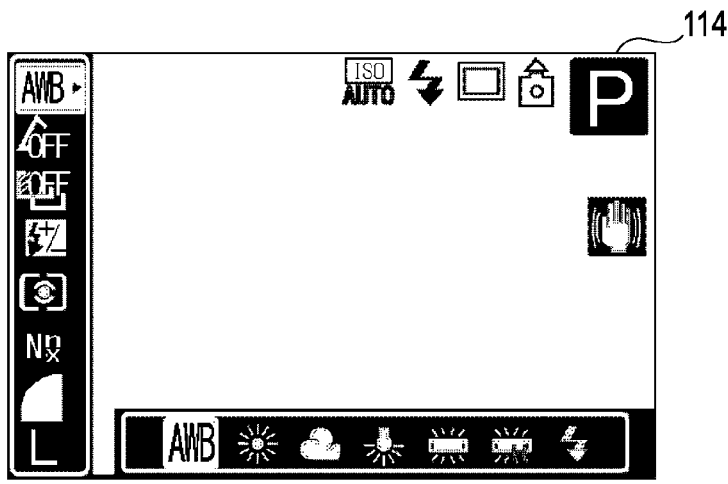
FIGS. 6A to 6C are diagrams showing a change in the display style in which a list of correction values for white balance according to the present embodiment is displayed.
Figure 6B:
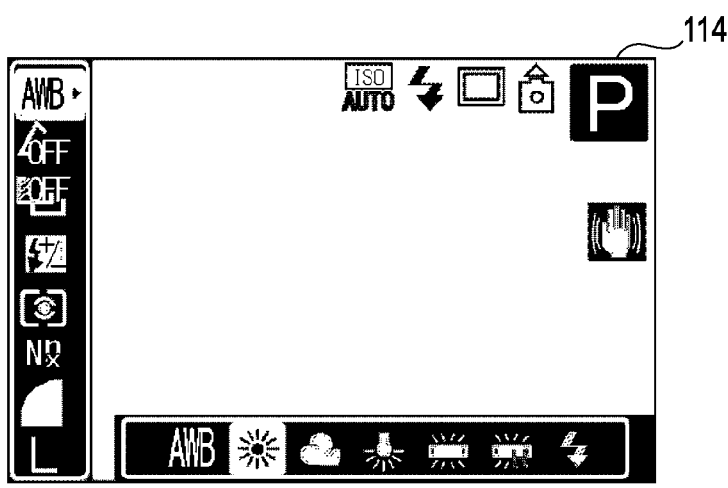
Figure 6C:
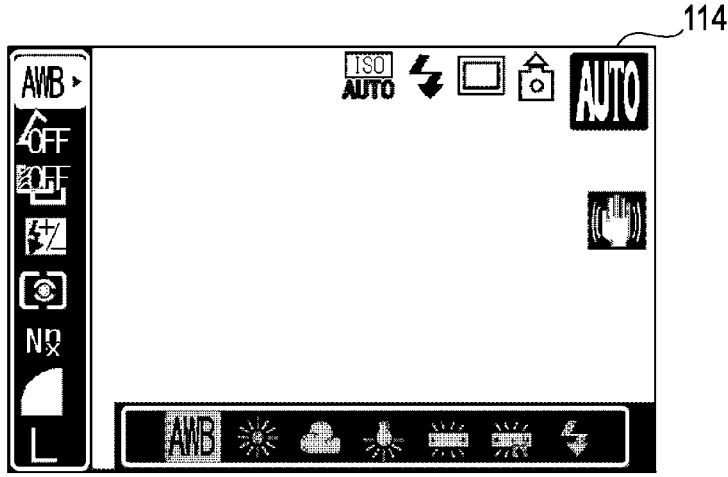

FIGS. 6A to 6C show an example of the display of a screen of the display unit 114 when the item for the white balance setting is selected in the program mode. The item for the white balance setting includes optimal setting values of an automatic setting and settings of other situations such as fine weather, cloudy weather, shade, and fluorescent light. If the program mode has been selected, as shown in FIGS. 6A and 6B, a user is allowed to appropriately select a setting value. FIG. 6A is a diagram showing that the automatic setting is selected, and FIG. 6B is a diagram showing that the fine weather setting is selected. In FIGS. 6A and 6B, reversed icons indicating the automatic setting and the fine weather setting are displayed as information indicating that these settings are currently selected.

When the mode of the image pickup apparatus is changed from the program mode to the auto mode in this state, the MPU 120 prohibits the changing of the white balance setting value. As shown in FIG. 6C, on the FUNC menu, the icon corresponding to the item for the white balance setting, which is currently selected, is displayed in an active state and the item for the white balance setting is still selected. Only the window indicating the icons indicating the automatic setting, the fine weather setting, or the other settings displayed in the lower portion of the screen is displayed grayed out.

When the mode of the image pickup apparatus is changed to the program mode again in this state, the display state of the display unit 114 returns to the state shown in FIG. 6A.

Figure 7A:
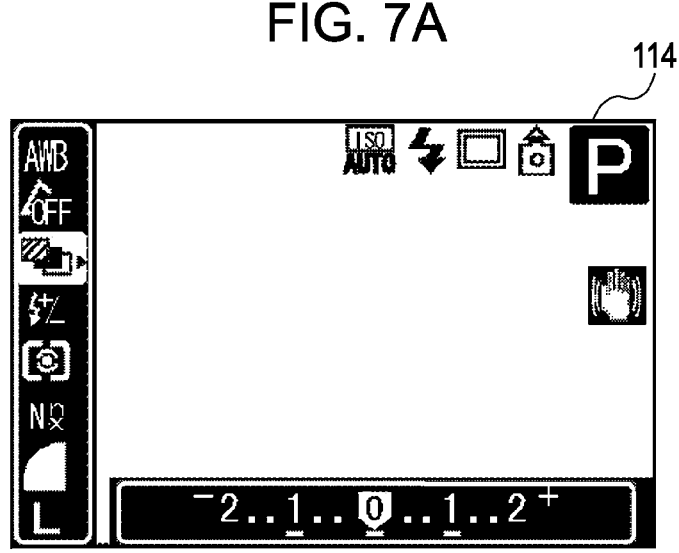
FIGS. 7A and 7B are diagrams showing a change in the display style in which a list of correction values for bracket shooting according to the present embodiment is displayed.
Figure 7B:
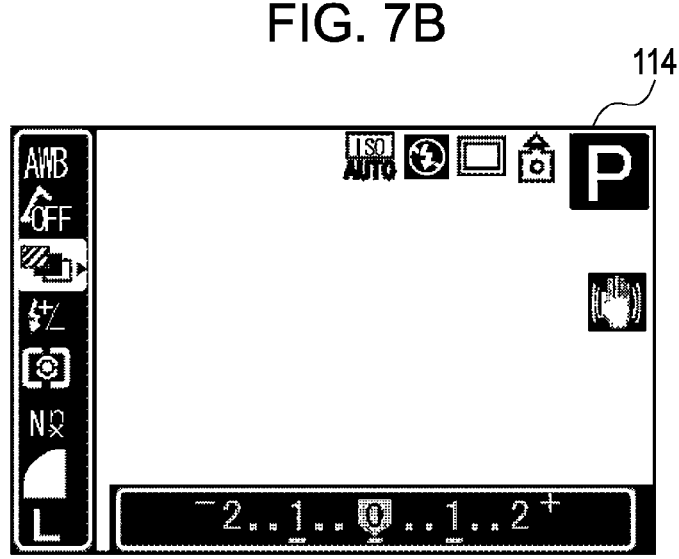
Figure 8:
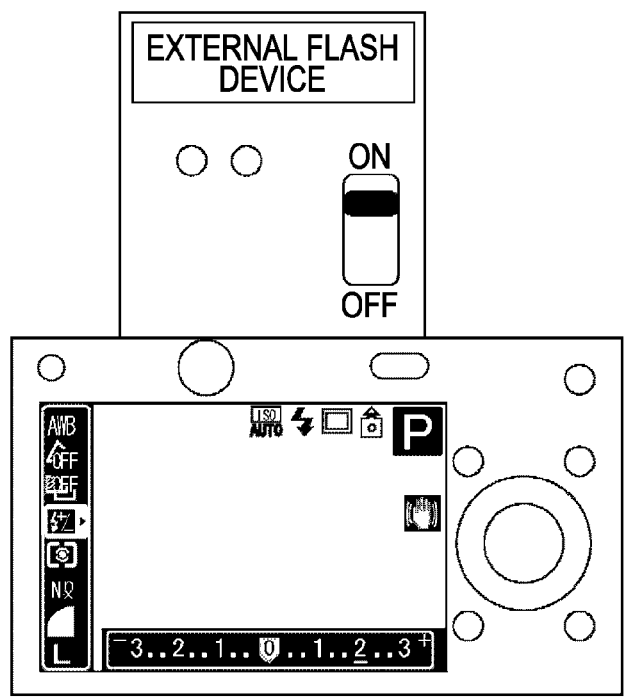
FIG. 8 is a diagram showing an example of a display screen of a display unit for displaying a window for setting a light-control correction value of an external flash device.
Figure 9A:
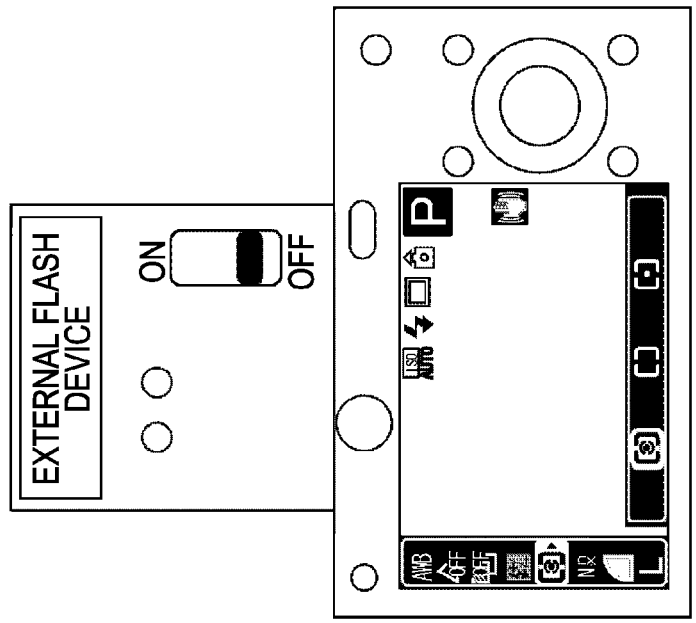
FIGS. 9A and 9B are diagrams showing an example of a change of a display screen of a display unit of a camera of the related art when an external flash device is powered off.
Figure 9B:
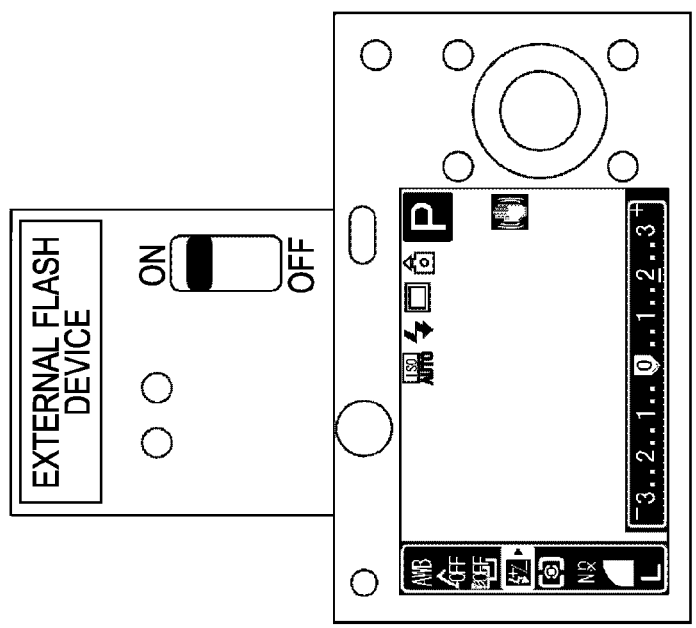

FIGS. 7A and 7B show another example of the display of a screen of the display unit 114 when the item for the bracket shooting setting is selected. In this example, bracket shooting is a function for performing photographing three times with different exposures automatically changed by the image pickup apparatus according to the set range of exposure correction values. When a photographic condition for performing flash light photographing using a flash device is selected, the item for the bracket shooting setting is disabled.

FIG. 7A shows an example of the screen of the display unit 114 that is currently displayed when a condition under which the image pickup apparatus performs photographing without emitting a flash of light from a flash device is set and when the icon corresponding to the item for the bracket shooting setting is currently selected. The range of exposure correction values of three images can be changed by selecting setting values displayed in the window in the lower portion of the screen.

When the photographic condition of the image pickup apparatus is changed to a condition for performing flash light photographing using a flash device in this state, the MPU 120 prohibits the changing of the bracket shooting setting values. As shown in FIG. 7B, on the FUNC menu, the icon corresponding to the item for the bracket shooting setting, which is currently selected, is displayed in an active state and the item for the bracket shooting setting is still selected. Only the window indicating setting values displayed in the lower portion of the screen is displayed grayed out.

When the photographic condition of the image pickup apparatus is changed to a condition for performing photographing without emitting a flash of light from a flash device again in this state, the display state of the display unit 114 returns to the state shown in FIG. 7A.

According to the present embodiment, therefore, an image pickup apparatus capable of performing photographing, while switching shooting modes or settings regarding the emission of a flash of light from a flash device, without causing a user to perform any additional operation for white balance or bracket shooting settings is achieved.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-205407 filed Aug. 7, 2007, which is hereby incorporated by reference herein in its entirety.

What is claimed is:

1. An image pickup apparatus having a flash device comprising:

a display unit configured to display a setting item screen for displaying setting items regarding a photographic condition of a corresponding function, and a setting value screen configured to display setting values regarding the setting item selected on the setting item screen, the display unit being configured to display information indicating which of the setting item selected on the setting item screen is currently selected;

an operation unit configured to select one of the setting items on the setting item screen and to select one of the setting values on the setting value screen, one of the setting values regarding the setting item selected being selectable upon selection of one of the setting items by the operation unit; and a control unit configured to set the photographic condition according to the setting value selected on the setting value screen, wherein the selected setting item is an item for changing a light-control correction value of the flash device or a value indicating a fixed amount of light emission from the flash device, wherein in a case where an operating state of the flash device is changed from an active state in which a function corresponding to the selected setting item is active to a non-active state in which the function corresponding to the selected setting item is non-active, the display unit continuously displays information indicating that the selected setting item is currently selected even when the function corresponding to the selected setting item is non-active, and the setting value regarding the selected setting item remains unchanged.

2. The image pickup apparatus according to claim 1, wherein if the state of the image pickup apparatus is changed from the state in which the function corresponding to the selected setting item is active to the state in which the function corresponding to the selected setting item is non-active, the display unit changes a display style in which the setting value regarding the selected setting item is displayed on the setting value screen.

3. The image pickup apparatus according to claim 1, wherein if the state of the image pickup apparatus is changed from the state in which the function corresponding to the selected setting item is active to the state in which the function corresponding to the selected setting item is non-active, the display unit changes a display style in which the setting value regarding the selected setting item is displayed on the setting value screen without changing a display style in which the selected setting item is displayed or a display style in which information indicating which of the selected setting item is currently selected is displayed.

4. The image pickup apparatus according to claim 1, wherein if the state of the image pickup apparatus is changed from the state in which the function corresponding to the selected setting item is active to the state in which the function corresponding to the selected setting item is non-active, the display unit changes a color in which a setting value regarding the selected setting item is displayed on the setting value display screen.

5. The image pickup apparatus according to claim 1, wherein if the state of the image pickup apparatus is changed from the state in which the function corresponding to the selected setting item is active to the state in which the function corresponding to the selected setting item is non-active, the display unit changes a display style in which a setting value regarding the selected setting item is displayed on the setting value screen, and wherein if the state of the image pickup apparatus is changed from the state in which the function corresponding to the selected setting item is non-active to the state in which the function corresponding to the selected setting item is active, the display unit returns the setting value screen on which the display style has been changed to a display style before the change.

6. The image pickup apparatus according to claim 1, wherein the display unit is configured to display information indicating that the setting value selected on the setting value screen is currently selected, and wherein if the state of the image pickup apparatus is changed from the state in which the function corresponding to the selected setting item is active to the state in which the function corresponding to the selected setting item is non-active and thereafter the state of the image pickup apparatus is changed again to the state in which the function corresponding to the selected setting item is active, the display unit displays information indicating that a setting value that has been selected by the operation unit before the state of the image pickup apparatus is changed to the state in which the function corresponding to the selected setting item is non-active is currently selected.

7. The image pickup apparatus according to claim 1, wherein the selected setting item is an item for changing a setting of an external flash device connected to the image pickup apparatus, and wherein when an operating state of the external flash device is changed from a power-on state to a power-off state, the state of the image pickup apparatus is changed from a state in which the function corresponding to the item for changing the setting of the external flash device is active to a state in which the function corresponding to the item for changing the setting of the external flash device is non-active.

8. The image pickup apparatus according to claim 7, wherein a setting value regarding the item for changing the setting of the external flash device is one of a light-control correction value of the external flash device and a value indicating a fixed amount of light emission from the external flash device.

9. The image pickup apparatus according to claim 1, wherein the display unit displays the setting value screen regarding the setting item selected in accordance with selection of one of the setting items by the operation unit.

10. An image pickup apparatus to which an external flash device is connected, the image pickup apparatus comprising:

a display unit configured to display a setting item screen for displaying setting items regarding a photographic condition, and a setting value screen configured to display setting values regarding a setting item selected from the setting item screen, the display unit being configured to display information indicating which of the setting item selected on the setting item screen is currently selected;

an operation unit configured to select one of the setting items on the setting item screen and to select one of the setting values on the setting value screen, one of the setting values regarding the setting item selected being selectable upon selection of one of the setting items by the operation unit; and a control unit configured to set the photographic condition according to the setting value selected on the setting value screen, wherein the selected setting item is an item for changing a light-control correction value of the connected external flash device or a value indicating a fixed amount of light emission from the external flash device, wherein when an operating state of the external flash device is changed from a power-on state to a power-off state, the display unit changes a color in which the setting value regarding the selected setting item is displayed on the setting value display screen without changing a display style in which the selected setting item is displayed or a display style in which information indicating which of the selected setting item is currently selected is displayed, and the setting value regarding the selected setting item remains unchanged.

11. The image pickup apparatus according to claim 10, wherein the display unit changing the color in which the setting value regarding the selected setting item is displayed on the setting value display screen includes graying out the setting value.

12. A control method for an image pickup apparatus having a flash device including a display unit configured to display a setting item screen configured to display setting items regarding a photographic condition of a corresponding function, and a setting value screen configured to display setting values regarding a setting item selected on the setting item screen, an operation unit configured to select one of the setting items on the setting item screen and to select one of the setting values on the setting value screen, one of the setting values regarding the setting item selected being selectable upon selection of one of the setting items by the operation unit, and a control unit configured to set the photographic condition according to the setting value selected on the setting value screen, wherein the setting item selected is an item for changing a light-control correction value of the flash device or a value indicating a fixed amount of light emission from the flash device, the control method comprising:

displaying information indicating that, among the setting items displayed on the setting item screen, the setting item selected on the setting item screen is currently selected;

continuously displaying, using the display unit, in a case where a state of the image pickup apparatus is changed from an operating state in which a function corresponding to the selected setting item is active to an operating state in which the function corresponding to the selected setting item is non-active, information indicating that the selected setting item is currently selected even when the function corresponding to the selected setting item is non-active; and not changing, using the control unit, the setting value regarding the selected setting item in a case where the state of the image pickup apparatus is changed from the state in which the selected setting item is active to the state in which the selected setting item is non-active.

13. A control method for an image pickup apparatus to which an external flash device is connected, the method comprising:
 displaying setting items via a setting item screen regarding a photographic condition;
 displaying setting values regarding a setting item selected from the setting item screen via a setting value screen, wherein a display unit is configured to display information indicating which of the setting item selected on the setting item screen is currently selected;
 selecting one of the setting items on the setting item screen and to select one of the setting values on the setting value screen via an operation unit, one of the setting values regarding the setting item selected being selectable upon selection of one of the setting items by the operation unit; and
 setting the photographic condition according to the setting value selected on the setting value screen via a control unit,
 wherein the selected setting item is an item for changing a light-control correction value of the connected external flash device or a value indicating a fixed amount of light emission from the external flash device,
 wherein when an operating state of the external flash device is changed from a power-on state to a power-off state, the display unit changes a color in which the setting value regarding the selected setting item is displayed on the setting value display screen without changing a display style in which the selected setting item is displayed or a display style in which information indicating which of the selected setting item is currently selected is displayed, and
 the setting value regarding the selected setting item remains unchanged.

* * * * *